United States Patent
Patel et al.

(10) Patent No.: US 8,598,095 B2
(45) Date of Patent: Dec. 3, 2013

(54) LOW CONDUCTIVITY WATER BASED WELLBORE FLUID

(75) Inventors: Arvind D. Patel, Sugar Land, TX (US); Emanuel Stamatakis, Houston, TX (US)

(73) Assignee: M-I L.L.C., Houston, TX (US)

( * ) Notice: Subject to any disclaimer, the term of this patent is extended or adjusted under 35 U.S.C. 154(b) by 475 days.

(21) Appl. No.: 12/992,320

(22) PCT Filed: Jun. 3, 2009

(86) PCT No.: PCT/US2009/046040
§ 371 (c)(1),
(2), (4) Date: Nov. 12, 2010

(87) PCT Pub. No.: WO2009/152002
PCT Pub. Date: Dec. 17, 2009

(65) Prior Publication Data
US 2011/0061866 A1    Mar. 17, 2011

Related U.S. Application Data

(60) Provisional application No. 61/060,654, filed on Jun. 11, 2008.

(51) Int. Cl.
*B28D 1/14* (2006.01)
(52) U.S. Cl.
USPC .......................................... 507/253; 166/261
(58) Field of Classification Search
None
See application file for complete search history.

(56) References Cited

U.S. PATENT DOCUMENTS

| 5,350,740 | A | | 9/1994 | Patel et al. | |
| 5,393,463 | A | | 2/1995 | Fikentscher et al. | |
| 5,424,284 | A | * | 6/1995 | Patel et al. | 507/129 |
| 5,771,971 | A | | 6/1998 | Horton et al. | |
| 5,908,814 | A | * | 6/1999 | Patel et al. | 507/131 |
| 6,247,543 | B1 | | 6/2001 | Patel et al. | |
| 2002/0155956 | A1 | | 10/2002 | Chamberlain et al. | |
| 2005/0049149 | A1 | | 3/2005 | Patel et al. | |
| 2005/0049150 | A1 | * | 3/2005 | Patel et al. | 507/136 |
| 2008/0076681 | A1 | | 3/2008 | Patel et al. | |

OTHER PUBLICATIONS

International Search Report issued in PCT/US2009/046040, mailed on Jan. 12, 2010, 3 pages.
Written Opinion PCT/US2009/046040, mailed on Jan. 12, 2010, 4 pages.
Official Action, with English translation, issued in corresponding Eurasian Application No. 201071399 dated Dec. 10, 2012 (6 pages).
Extended European Search Report issued in corresponding European Application No. 09763293.9 dated Apr. 12, 2012 (8 pages).
Office Action issued in corresponding Eurasian Application No. 201071399 dated Apr. 24, 2012 (4 pages).
Official Action issued in corresponding Mexican Application No. MX/a/2010/013230 with English reporting letter dated May 28, 2013 (4 pages).

* cited by examiner

*Primary Examiner* — James J Seidleck
*Assistant Examiner* — Kumar Bhushan
(74) *Attorney, Agent, or Firm* — Osha Liang LLP

(57) ABSTRACT

A low electrical conductivity water-based wellbore fluid for use in drilling wells through a formation containing a clay which swells in the presence of water, said wellbore fluid that includes an aqueous base fluid; and a polymeric non-ionic tertiary amine is disclosed. Methods of using such fluids are also disclosed.

20 Claims, No Drawings

LOW CONDUCTIVITY WATER BASED WELLBORE FLUID

BACKGROUND OF INVENTION

1. Field of the Invention

Embodiments disclosed herein relate generally to shale hydration inhibition agents for use in water-based wellbore fluid. In particular, embodiments disclosed herein relate to low conductivity wellbore fluid for use in drilling through shales.

2. Background Art

To facilitate the drilling of a well, fluid is circulated through the drill string, out the bit and upward in an annular area between the drill string and the wall of the borehole. Common uses for well fluids include: lubrication and cooling of drill bit cutting surfaces while drilling generally or drilling-in (i.e., drilling in a targeted petroliferous formation), transportation of "cuttings" (pieces of formation dislodged by the cutting action of the teeth on a drill bit) to the surface, controlling formation fluid pressure to prevent blowouts, maintaining well stability, suspending solids in the well, minimizing fluid loss into and stabilizing the formation through which the well is being drilled, fracturing the formation in the vicinity of the well, displacing the fluid within the well with another fluid, cleaning the well, testing the well, transmitting hydraulic horsepower to the drill bit, fluid used for emplacing a packer, abandoning the well or preparing the well for abandonment, and otherwise treating the well or the formation.

Drilling fluids are typically classified according to their base material. The selection of the type of drilling fluid to be used in a drilling application involves a careful balance of both the good and bad characteristics of the drilling fluids in the particular application and the type of well to be drilled. In oil-based fluids, solid particles are suspended in oil (the continuous phase), and water or brine may be emulsified with the oil. In water-based fluids, solid particles are suspended in water or brine (continuous phase) including solid particles such as 1) clays and organic colloids added to provide necessary viscosity and filtration properties; 2) heavy minerals whose function is to increase the drilling fluid's density; and 3) formation solids that become dispersed in the drilling fluid during the drilling operation. Historically, water based drilling fluids have been used to drill a majority of wells. Their lower cost and better environment acceptance as compared to oil based drilling fluids continue to make them the first option in drilling operations. However, as mentioned above, the selection of a fluid frequently may depend on the type of formation through which the well is being drilled. Where the formation solids are clay minerals that swell, the presence of either type of formation solids in the drilling fluid can greatly increase drilling time and costs.

The types of subterranean formations, intersected by a well, which may be at least partly composed of clays, includes shales, mudstones, siltstones, and claystones. In penetrating through such formations, many problems may be encountered including bit balling, swelling or sloughing of the wellbore, stuck pipe, and dispersion of drill cuttings. This may be particularly true when drilling with a water-based fluid due to the high reactivity of clay in an aqueous environment.

Clay minerals are generally crystalline in nature. The structure of a clay's crystals determines its properties. Typically, clays have a flaky, mica-type structure. Clay flakes are made up of a number of crystal platelets stacked face-to-face. Each platelet is called a unit layer, and the surfaces of the unit layer are called basal surfaces. Each unit layer is composed of multiple sheets, which may include octahedral sheets and tetrahedral sheets. Octahedral sheets are composed of either aluminum or magnesium atoms octahedrally coordinated with the oxygen atoms of hydroxyls, whereas tetrahedral sheets consist of silicon atoms tetrahedrally coordinated with oxygen atoms.

Sheets within a unit layer link together by sharing oxygen atoms. When this linking occurs between one octahedral and one tetrahedral sheet, one basal surface consists of exposed oxygen atoms while the other basal surface has exposed hydroxyls. It is also quite common for two tetrahedral sheets to bond with one octahedral sheet by sharing oxygen atoms. The resulting structure, known as the Hoffman structure, has an octahedral sheet that is sandwiched between the two tetrahedral sheets. As a result, both basal surfaces in a Hoffman structure are composed of exposed oxygen atoms. The unit layers stack together face-to-face and are held in place by weak attractive forces. The distance between corresponding planes in adjacent unit layers is called the d-spacing. A clay crystal structure with a unit layer consisting of three sheets typically has a d-spacing of about $9.5 \times 10^{-7}$ mm.

In clay mineral crystals, atoms having different valences commonly will be positioned within the sheets of the structure to create a negative potential at the crystal surface, which causes cations to be adsorbed thereto. These adsorbed cations are called exchangeable cations because they may chemically trade places with other cations when the clay crystal is suspended in water. In addition, ions may also be adsorbed on the clay crystal edges and exchange with other ions in the water.

The type of substitutions occurring within the clay crystal structure and the exchangeable cations adsorbed on the crystal surface greatly affect clay swelling, a property of primary importance in the drilling fluid industry. Clay swelling is a phenomenon in which water molecules surround a clay crystal structure and position themselves to increase the structure's d-spacing thus resulting in an increase in volume. Two types of swelling may occur: surface hydration and osmotic swelling.

Surface hydration is one type of swelling in which water molecules are adsorbed on crystal surfaces. Hydrogen bonding holds a layer of water molecules to the oxygen atoms exposed on the crystal surfaces. Subsequent layers of water molecules align to form a quasi-crystalline structure between unit layers, which results in an increased d-spacing. Virtually all types of clays swell in this manner.

Osmotic swelling is a second type of swelling. Where the concentration of cations between unit layers in a clay mineral is higher than the cation concentration in the surrounding water, water is osmotically drawn between the unit layers and the d-spacing is increased. Osmotic swelling results in larger overall volume increases than surface hydration. However, only certain clays, like sodium montmorillonite, swell in this manner.

Exchangeable cations found in clay minerals are reported to have a significant impact on the amount of swelling that takes place. The exchangeable cations compete with water molecules for the available reactive sites in the clay structure. Generally cations with high valences are more strongly adsorbed than ones with low valences. Thus, clays with low valence exchangeable cations will swell more than clays whose exchangeable cations have high valences.

Clay swelling during the drilling of a subterranean well can have a tremendous adverse impact on drilling operations. The overall increase in bulk volume accompanying clay swelling impedes removal of cuttings from beneath the drill bit, increases friction between the drill string and the sides of the borehole, and inhibits formation of the thin filter cake that seals formations. Clay swelling can also create other drilling problems such as loss of circulation or stuck pipe that slow drilling and increase drilling costs. Thus, given the frequency in which shale is encountered in drilling subterranean wells, the development of a substance and method for reducing clay swelling remains a continuing challenge in the oil and gas exploration industry.

Accordingly, there exists a continuing need for developments in shale hydration inhibition agents.

SUMMARY OF INVENTION

In one aspect, embodiments disclosed herein relate to a low electrical conductivity water-based wellbore fluid for use in drilling wells through a formation containing a clay which swells in the presence of water, said wellbore fluid that includes an aqueous base fluid; and a polymeric non-ionic tertiary amine.

In another aspect, embodiments disclosed herein relate to a method of reducing the swelling of clay in a well that includes circulating in the well a water based wellbore fluid comprising: an aqueous base fluid; and a polymeric non-ionic tertiary amine.

In yet another aspect, embodiments disclosed herein relate to a method for controlling shale hydration in the drilling of subterranean wells that includes adding to said well a water-based wellbore fluid comprising: an aqueous base fluid; and a polymeric non-ionic tertiary amine.

Other aspects and advantages of the invention will be apparent from the following description and the appended claims.

DETAILED DESCRIPTION

In one aspect, embodiments disclosed herein relate to a water-based wellbore fluid for use in drilling wells through a formation containing a shale which swells in the presence of water. Generally the wellbore fluid of the present disclosure may be formulated to include an aqueous continuous phase and a polymeric non-ionic amine shale hydration inhibition agent. Further, as disclosed below, the fluids of the present disclosure may optionally include additional components, such as weighting agents, viscosity agents, fluid loss control agents, bridging agents, lubricants, anti-bit balling agents, encapsulating agents, corrosion inhibition agents, alkali reserve materials and buffering agents, surfactants and suspending agents, rate of penetration enhancing agents and the like that one of skill in the art would appreciate may be added to an aqueous based wellbore fluid.

A polymeric non-ionic amine shale hydration inhibition agent is included in the formulation of the wellbore fluids of the present disclosure so that the hydration of shale and shale like formations is inhibited. Thus, the polymeric non-ionic amine should be present in sufficient concentration to reduce either or both the surface hydration based swelling and/or the osmotic based swelling of the shale clay. It is postulated that such shale inhibition may likely result from production of a barrier or film at the clay surface or within the clay matrix. Thus, when drilling through a formation having water-swellable clays therein, a wellbore fluid having the additives of the present disclosure may be circulated therein to reduce the swelling of clays or shale hydration.

Many conventional shale hydration inhibition agents rely on a cationic character so that the cationic character may exchange with exchangeable cations found on the surface of the shale or other swellable clay. While such mechanism for shale hydration may be suitable for some wells (such as off-shore wells), land-based drilling presents a need for low electrical conductivity fluids. Specifically, such low conductivity is desired for disposal of cuttings. Land disposal of water-based fluids and cuttings is an environmental concern due to a potential for high conductivity/salinity which cause a possibility of leaching and groundwater contamination. Salt, unlike hydrocarbons, cannot biodegrade but may accumulate in soils, which have a limited capacity to accept salts. If salt levels become too high, the soils may be damaged and the soil's ability to naturally degrade organic materials by microorganisms present in the soil can be inhibited.

Using the polymeric non-ionic amines, shale hydration inhibition may be achieved without increasing the electrical conductivity of the wellbore fluid. Thus, the fluids of the present disclosure may be classified as low electrical conductivity fluids. As used herein, a "low electrical conductivity fluid" refers to a fluid having an electrical conductivity of no more than 10,000 µS/cm. However, in accordance with particular embodiments of the present disclosure, fluids having electrical conductivities of less than about 3000 µS/cm may be achieved, and less than about 2000 µS/cm in more particular embodiments.

Generally, the amines of the present disclosure are formed from tertiary trihydroxy alkyl amines, such as trimethanolamine, triethanolamine and tripropanolamine. Particularly, the polymeric amines of the present disclosure may be condensation products represented by the following formula:

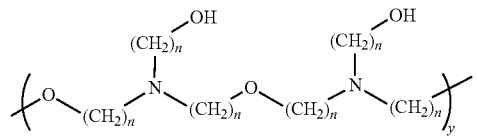

wherein each n may independently be selected to be a value ranging from 1 to 3, and y ranges from 2 to 2,000. Further, one skilled in the art would appreciate that the above formula is a simplified representation, and that condensation may occur between any and all of the hydroxyl groups.

The polymerized additives may have a molecular weight ranging from about 200 to about 15,000, and from about 350 to about 5,000 in a particular embodiment. One skilled in the art would appreciate that other molecular weights may be used; however, for practical purposes the upper limit of the molecular weight may be governed by maximum viscosities appropriate for polymer manufacture.

The polymerized additives are prepared generally by condensation polymerization. In performing the condensation procedure it is contemplated that several catalysts may be used, including base catalysts. Generally, base catalysts may include, but are not limited to, sodium hydroxide, calcium hydroxide, potassium hydroxide and the like. Acid catalysts such as zinc chloride and calcium chloride may alternatively be used.

The additives of the present disclosure may be added to a wellbore fluid in concentrations sufficient to deal with the clay swelling problems at hand. Concentrations between about 0.5 pounds per barrel (ppb) and 10 ppb are contemplated and are considered to be functionally effective to reduce swelling of clays which swell in the presence of water.

The aqueous based continuous phase may generally be any water based fluid phase that is compatible with the formulation of a drilling fluid and is compatible with the shale hydration inhibition agents disclosed herein. In a particular embodiment, the aqueous based continuous phase may include fresh water. However, in alternative embodiments, the fluid may include at least one of fresh water, mixtures of water and water soluble organic compounds and mixtures thereof. One skilled in the art would appreciate that conductivity requirements of a fluid may depend on the regulatory requirements for disposal of fluids/cuttings in a particular jurisdiction, and thus, for jurisdictions having relatively higher conductivity limits, inclusion of some salt in the fluid may be provided. In such instances, for example, the aqueous fluid may be formulated with mixtures of desired salts in fresh water. Such salts may include, but are not limited to alkali metal chlorides, hydroxides, or carboxylates, for example. In various embodiments of the drilling fluid disclosed herein, the brine may include seawater, aqueous solutions wherein the salt concentration is less than that of sea water, or aqueous solutions wherein the salt concentration is greater than that of sea water. Salts that may be found in seawater include, but are not limited to, sodium, calcium, aluminum, magnesium, potassium, strontium, lithium, and salts of chlorides, bromides, carbonates, iodides, chlorates, bromates, formates, nitrates, oxides, sulfates, phosphates, silicates and fluorides. Salts that may be incorporated in a given brine include any one or more of those present in natural seawater or any other organic or inorganic dissolved salts. Additionally, brines that may be used in the drilling fluids disclosed herein may be natural or synthetic, with synthetic brines tending to be much simpler in constitution. One of ordinary skill would appreciate that the above salts may be present in the base fluid, or alternatively, may be added according to the method disclosed herein. Further, the amount of the aqueous based continuous phase should be sufficient to form a water based drilling fluid. This amount may range from nearly 100% of the wellbore fluid to less than 30% of the wellbore fluid by volume. Preferably, the aqueous based continuous phase may constitute from about 95 to about 30% by volume and preferably from about 90 to about 40% by volume of the wellbore fluid.

It is essential that the wellbore fluid ultimately selected and formulated for use in any particular well application be balanced to the conditions of the well. Therefore, although the base ingredients remain the same, i.e., base fluid and the amine additives of the present disclosure, other components may be added.

The wellbore fluids of the present disclosure may include a weight material or weighting agent in order to increase the density of the fluid. The primary purpose for such weighting materials is to increase the density of the fluid so as to prevent kick-backs and blow-outs. One of skill in the art should know and understand that the prevention of kick-backs and blow-outs is important to the safe day to day operations of a drilling rig. Thus the weighting agent may be added to the drilling fluid in a functionally effective amount largely dependent on the nature of the formation being drilled. Weight materials suitable for use in the formulation of the drilling fluids of the claimed subject matter may be generally selected from any type of weighting materials be it in solid, particulate form, suspended in solution, dissolved in the aqueous phase as part of the preparation process or added afterward during drilling. Weighting agents or density materials suitable for use in the fluids disclosed herein include galena, hematite, magnetite, iron oxides, illmenite, barite, siderite, celestite, dolomite, calcite, and the like, and mixtures and combinations of these compounds and similar such weight materials that may be used in the formulation of wellbore fluids. The quantity of such material added, if any, may depend upon the desired density of the final composition. Typically, weighting agent is added to result in a drilling fluid density of up to about 24 pounds per gallon. The mud weight may be adjusted up to 21 pounds per gallon in one embodiment, and up to 19.5 pounds per gallon in another embodiment.

The wellbore fluids may also include a viscosifying agent in order to alter or maintain the rheological properties of the fluid. The primary purpose for such viscosifying agents is to control the viscosity and potential changes in viscosity of the drilling fluid. Viscosity control is particularly important because often a subterranean formation may have a temperature significantly higher than the surface temperature. Thus a wellbore fluid may undergo temperature extremes of nearly freezing temperatures to nearly the boiling temperature of water or higher during the course of its transit from the surface to the drill bit and back. One of skill in the art should know and understand that such changes in temperature can result in significant changes in the rheological properties of fluids. Thus in order to control and/or moderate the rheology changes, viscosity agents and rheology control agents may be included in the formulation of the wellbore fluid. Viscosifying agents suitable for use in the formulation of the fluids of the present disclosure may be generally selected from any type of viscosifying agents suitable for use in aqueous based drilling fluids. In one illustrative embodiment, an optional viscosifying agent is included in the drilling fluid and the viscosifying agent is preferably selected mixtures and combinations of compounds that should be known to one of skill in the art such as xanthan gums, starches, modified starches and synthetic viscosifiers such as polyarcylamides, and the like.

In addition to the other components previously noted, materials generically referred to as thinners and fluid loss control agents may also be optionally added to water-based wellbore fluid formulations. Of these additional materials, each may be added to the formulation in a concentration as rheologically and functionally required by drilling conditions.

Thinners are typically added to a drilling fluid to reduce flow resistance and control gelation tendencies. Other functions performed by thinners include reducing filtration and filter cake thickness, counteracting the effects of salts, minimizing the effects of water on the formations drilled, emulsifying oil in water, and stabilizing mud properties at elevated temperatures. Thinners may include materials such as lignosulfonates, modified lignosulfonates, polyphosphates and tannins. In other embodiments, low molecular weight polyacrylates may also be added as thinners.

A variety of fluid loss control agents may be added to the wellbore fluids of the present disclosure that are generally selected from a group consisting of synthetic organic polymers, biopolymers, and mixtures thereof. The fluid loss control agents such as modified lignite, polymers, modified starches and modified celluloses may also be added to the water base drilling fluid system of this invention. In one embodiment it is preferred that the additives of the invention should be selected to have low toxicity and low conductivity and to be compatible with common anionic drilling fluid additives such as polyanionic carboxymethylcellulose (PAC or CMC), polyacrylates, partially-hydrolyzed polyacrylamides (PHPA), lignosulfonates, xanthan gum, mixtures of these and the like.

In addition to the components noted above, the wellbore fluids may also be formulated to include materials generically referred to as alkali reserve and alkali buffering agent. One of skill in the art should appreciate that lime and sodium hydroxide are the principle alkali reserve agent utilized in formulating water based wellbore fluids. Alkali buffering agents, such as cyclic organic amines, sterically hindered amines, amides of fatty acids and the like may also be included to serve as a buffer against the loss of the alkali reserve agent. The fluids may also contain anticorrosion agents as well to prevent corrosion of the metal components of the drilling operational equipment. Other additives that may be present in the fluids of the present disclosure may include products such as lubricants, penetration rate enhancers, defoamers, fluid loss circulation products and so forth. Such compounds should be known to one of ordinary skill in the art of formulating aqueous based wellbore fluids.

EXAMPLES

The following examples show an embodiment of a polymeric amine according to the present disclosure. In the following examples various additives are used including: DUO-VIS®, a xanthan gum, BIOVIS®, a scleroglucan viscosifier, are used as viscosifiers; FLOTROL™ is a starch derivative used in filtration; POLYPAC® UL polyanionic cellulose (PAC), a water-soluble polymer designed to control fluid loss; EMI-1994, non-ionic synthetic polymer for encapsulation; EMI-1993, a polymeric non-ionic amine; GLYDRIL®, a polyglycol used as a cloud point additive; POLY-PLUS® RD is an acrylic copolymer used in shale encapsulation; EMI-1037, is a starch-butadiene-styrene copolymer; and KLA-GARD®, a shale stabilizer, all of which are available from M-I LLC (Houston, Tex.). BIOVIS®, a scleroglucan viscosifier, is used as a viscosifier, and is available from BASF Corporation (Florham Park, N.J.).

Example 1

A fluid using a polymeric amine of the present disclosure was compared to a conventional shale-inhibitive potassium-based fluid. The fluid formulations are shown in Table 1.

TABLE 1

| Product | | Comparative Sample 1 | Sample 1 |
|---|---|---|---|
| Freshwater | ppb | 309 | 309 |
| BIOVIS ® | ppb | — | 1.67 |
| DUOVIS ® | ppb | 1 | — |
| FLOTROL ® | ppb | — | 3 |
| POLYPAC ® UL | ppb | 3 | — |
| KOH | | drops | drops |
| EMI-1994 | ppb | — | 1 |
| EMI-1993 | ppb | — | 5 |
| GLYDRIL ® MC | ppb | 11 | — |
| KCl | ppb | 35 | — |
| POLYPLUS ® RD | ppb | 1 | — |
| Barite | ppb | 65 | 65 |

The fluids were heat aged for 16 hours at 150° F., the rheological properties of the heat-aged fluids were measured using a Fann 35 Viscometer, available from Fann Instrument Company. Electrical conductivity was also measured using a hand-held conductivity meter from Fischer-Scientific. The results are shown in Table 2.

TABLE 2

| Rheology | | Comparative Sample 1 | Sample 1 |
|---|---|---|---|
| Temperature | ° C. | 25 | 25 |
| 600 | rpm | 110 | 48 |
| 300 | rpm | 79 | 34 |
| 200 | rpm | 57 | 27 |
| 100 | rpm | 37 | 19 |
| 6 | rpm | 11 | 7 |
| 3 | rpm | 9 | 6 |

TABLE 2-continued

| Rheology | | Comparative Sample 1 | Sample 1 |
|---|---|---|---|
| GELS 10" | lbs/100 ft$^2$ | 11 | 14 |
| GELS 10' | lbs/100 ft$^2$ | 15 | 20 |
| Apparent Viscosity | cP | 55 | 24 |
| Plastic Viscosity | cP | 31 | 14 |
| Yield Point | lbs/100 ft$^2$ | 48 | 20 |
| pH | | 7.8 | 8.8 |
| Conductivity | uS/cm | 134,800 | 1,307 |

Dispersion tests were run with Arne cuttings by hot rolling 30 g of cuttings in approximately one-barrel equivalent of a mud for about 16 hours at about 150° F. After hot rolling, the cuttings were screened using a 20 mesh screen and washed with 10% KCl aqueous solution and dried to obtain the percentage recovered. Bulk Hardness tests were also run to demonstrate the performance of the fluids using a BP Bulk Hardness tester. A BP Bulk Hardness Tester available from M-I LLC is a device designed to give an assessment of the hardness of shale cuttings exposed to drilling fluids which in turn can be related to the inhibiting properties of the drilling fluid being evaluated. In this test, Arne shale cuttings are hot rolled in the test drilling fluid at 150° F. for 16 hours. Shale cuttings are screened and then placed into a BP Bulk Hardness Tester. The equipment is closed and using a torque wrench the force used to extrude the cuttings through a plate with holes in it is recorded. Depending on the hydration state and hardness of the cuttings and the drilling fluid used, a plateau region in torque is reached as extrusion of the cuttings begins to take place. Alternatively, the torque may continue to rise which tends to occur with harder cuttings samples. Therefore, the higher the torque number obtained, the more inhibitive the drilling fluid system is considered. The results of the dispersion and bulk hardness tests are shown in Table 3.

TABLE 3

| | Turns/Torque | Comparative Sample 1 | Sample 1 |
|---|---|---|---|
| Dispersion Test | | | |
| Initial Weight (g) | | 30 | 30 |
| Final Weight (g) | | 27.6 | 29.3 |
| Water Content (%) | | 3 | 3 |
| Percent Recovery (%) | | 94.8 | 100.7 |
| Bulk Hardness Test | | | |
| Turns/Torque | 1 | 0 | 0 |
| | 5 | 0 | 0 |
| | 6 | 0 | 0 |
| | 7 | 5 | 5 |
| | 8 | 10 | 20 |
| | 9 | 15 | 25 |
| | 10 | 15 | 25 |
| | 11 | 15 | 25 |
| | 12 | 20 | 30 |
| | 13 | 20 | 35 |
| | 14 | 20 | 35 |
| | 15 | 20 | 40 |
| | 16 | 22 | 45 |
| | 17 | 25 | 55 |
| | 18 | 30 | 80 |
| | 19 | 225 | 225 |

Example 2

Fluids with various mud weights and contaminations containing polymeric amines were formulated as shown in Table 4.

TABLE 4

| Product | | Sample 2 | Sample 3 | Sample 4 | Sample 5 | Sample 6 | Sample 7 |
|---|---|---|---|---|---|---|---|
| Freshwater | ppb | 328 | 303 | 277 | 318 | 312 | 328 |
| BIOVIS ® | ppb | 1.3 | 1.1 | 0.9 | 1.3 | 1.3 | 1.3 |
| FLOTROL ® | ppb | 3 | 3 | 3 | 3 | 3 | 3 |
| KOH | ppb | drops | drops | drops | drops | drops | drops |
| EMI-1994 | ppb | 1 | 1 | 1 | 1 | 1 | 1 |
| EMI-1993 | ppb | 5 | 5 | 5 | 5 | 5 | 5 |
| Rev Dust | ppb | — | — | — | 15 | 25 | — |
| Cement | ppb | — | — | — | — | — | 10 |
| Barite | ppb | 92 | 202 | 312 | 92 | 92 | 92 |
| Density | | 10 ppg | 12 ppb | 14 ppg | 10 ppg with 15 ppb Rev dust | 10 ppg with 25 ppb Rev Dust | 10 ppg with 10 ppb Cement |

Fluid rheology and electrical conductivity are shown in Table 5 below. Fluid loss was measured with a standard API fluid loss cell according to procedures outlined in API spec 13B-1, and is also shown in Table 5.

TABLE 5

| | | Sample 2 | | Sample 3 | | Sample 4 | | Sample 5 | | Sample 6 | | Sample 7 | |
|---|---|---|---|---|---|---|---|---|---|---|---|---|---|
| Aging | hrs | — | 16 | — | 16 | — | 16 | — | 16 | — | 16 | — | 16 |
| Temp | ° F. | — | 150 | — | 150 | — | 150 | — | 150 | — | 150 | — | 150 |
| Heat Aging | Dynamic/Static | — | D | — | D | — | D | — | D | — | D | — | D |
| Rheology | | | | | | | | | | | | | | |
| Temp | ° C. | 25 | 25 | 25 | 25 | 25 | 25 | 25 | 25 | 25 | 25 | 25 | 25 |
| 600 | rpm | 40 | 40 | 65 | 63 | 56 | 82 | 45 | 46 | 50 | 50 | 46 | 52 |
| 300 | rpm | 25 | 27 | 39 | 41 | 30 | 48 | 28 | 32 | 31 | 34 | 29 | 32 |
| 200 | rpm | 17 | 21 | 27 | 30 | 22 | 36 | 20 | 26 | 22 | 28 | 20 | 24 |
| 100 | rpm | 11 | 15 | 18 | 20 | 14 | 23 | 13 | 19 | 14 | 20 | 13 | 17 |
| 6 | rpm | 2 | 6 | 4 | 7 | 4 | 7 | 3 | 7 | 4 | 9 | 3 | 7 |
| 3 | rpm | 2 | 5 | 3 | 6 | 3 | 5 | 3 | 6 | 3 | 8 | 3 | 6 |
| GELS 10" | lbs/100 ft² | 3 | 8 | 5 | 8 | 7 | 7 | 4 | 9 | 5 | 10 | 5 | 8 |
| GELS 10' | lbs/100 ft² | 4 | 11 | 9 | 12 | 17 | 14 | 6 | 14 | 7 | 14 | 8 | 9 |
| AV | cP | 20 | 20 | 32.5 | 31.5 | 28 | 41 | 22.5 | 23 | 25 | 25 | 23 | 26 |
| PV | cP | 15 | 13 | 26 | 22 | 26 | 34 | 17 | 14 | 19 | 16 | 17 | 20 |
| YP | lbs/100 ft² | 10 | 14 | 13 | 19 | 4 | 14 | 11 | 18 | 12 | 18 | 12 | 12 |
| Density | ppg | 10 | 10 | 12 | 12 | 14 | 14 | 10 | 10 | 10 | 10 | 10 | 10 |
| pH | | 9.1 | 9.1 | 9.2 | 9 | 9.2 | 9 | 9.5 | 9.3 | 9.7 | 9.3 | 11.3 | 11.7 |
| Fluid Loss | mL | | 4.6 | | 6 | | 7.8 | | 5.3 | | 5.4 | | 8.6 |
| Conductivity | uS/cm | 1015 | 1151 | 1028 | 1067 | 897 | 1003 | 821 | 863 | 775 | 821 | 2390 | 3660 |

Example 3

Fluids using a polymeric amine of the present disclosure were compared to a conventional shale-inhibitive potassium-based fluid, the formulations of which are shown in Table 6.

TABLE 6

| Product | | Comparative Sample 2 | Sample 8 | Sample 9 | Sample 10 |
|---|---|---|---|---|---|
| Freshwater | ppb | 328 | 328 | 328 | 328 |
| DUOVIS ® | ppb | 1.3 | — | — | — |
| BIOVIS ® | ppb | — | 1.3 | 2.0 | 1.3 |
| FLOTROL ® | ppb | 3 | 3 | 3 | 3 |
| KOH | ppb | drop | drop | drop | drop |
| KCl | ppb | 15 | — | — | — |
| KlaGard | ppb | 6 | — | — | — |
| EMI-1994 | ppb | — | 5 | 5 | 5 |
| EMI-1993 | ppb | — | 1 | 1 | 1 |
| Barite | ppb | 92 | 92 | 92 | 92 |
| EMI 1037 (added after heat aging) | ppb | — | — | — | 10.5 |

Fluid rheology, fluid loss, and electrical conductivity are shown in Table 7 below.

TABLE 7

| | | Comparative Sample 2 | | Sample 8 | | Sample 9 | | Sample 10 | |
|---|---|---|---|---|---|---|---|---|---|
| Aging | hrs | — | 16 | — | 16 | — | 16 | — | 16 |
| Temp | ° F. | — | 150 | — | 150 | — | 150 | — | 150 |
| Heat Aging | Dynamic/Static | — | D | — | D | — | D | — | D |

TABLE 7-continued

|  |  | Comparative Sample 2 | Sample 8 | Sample 9 | Sample 10 |  |  |
|---|---|---|---|---|---|---|---|
| Rheology |  |  |  |  |  |  |  |
| Temp | ° C. | 25 | 25 | 25 | 25 | 25 | 25 | 25 | 25 |
| 600 | rpm | 48 | 54 | 38 | 43 | 49 | 59 |  | 42 |
| 300 | rpm | 37 | 41 | 24 | 29 | 33 | 41 |  | 28 |
| 200 | rpm | 31 | 31 | 18 | 23 | 25 | 33 |  | 23 |
| 100 | rpm | 23 | 25 | 13 | 15 | 18 | 23 |  | 16 |
| 6 | rpm | 10 | 10 | 4 | 6 | 6 | 10 |  | 7 |
| 3 | rpm | 8 | 8 | 4 | 5 | 5 | 8 |  | 6 |
| GELS 10" | lbs/100 ft$^2$ | 10 | 11 | 6 | 8 | 8 | 12 |  | 8 |
| GELS 10' | lbs/100 ft$^2$ | 15 | 15 | 9 | 13 | 12 | 21 |  | 13 |
| AV | cP | 24 | 22 | 19 | 21.5 | 25 | 29.5 |  | 21 |
| PV | cP | 11 | 13 | 14 | 14 | 16 | 18 |  | 14 |
| YP | lbs/100 ft$^2$ | 26 | 28 | 10 | 15 | 17 | 23 |  | 14 |
| Density | ppg | 10 | 10 | 10 | 10 | 10 | 10 | 10 | 10 |
| pH |  | 7.7 | 7.8 | 9.1 | 9 | 9.1 | 9.1 |  | 8.9 |
| Fluid Loss | mL |  | 6 |  | 5.7 |  | 4.2 |  | 3.5 |
| Conductivity | uS/cm |  | 52200 |  | 982 |  | 892 |  | 1880 |

Dispersion and bulk hardness tests (using Oxy Argentina Shale) are shown in Table 8 below.

TABLE 8

|  |  | Comparative Sample 2 | Sample 8 |
|---|---|---|---|
| Dispersion Test |  |  |  |
| Initial Weight | g | 30 | 30 |
| Final Weight | g | 23.7 | 23.1 |
| Water Content | % | 16 | 16 |
| Percent Recovery | % | 94.05 | 91.67 |
| Bulk Hardness Test |  |  |  |
| Turns/Torque | 5 | 0 | 0 |
|  | 6 | 0 | 5 |
|  | 7 | 5 | 10 |
|  | 8 | 10 | 15 |
|  | 9 | 15 | 30 |
|  | 10 | 35 | 60 |
|  | 11 | 80 | 115 |
|  | 12 | 175 | 225 |
|  | 13 | 225 |  |

Example 5

A fluid using a polymeric amine of the present disclosure was compared to non-condensed trihydroxy alkyl amine. The fluid formulations are shown in Table 9.

TABLE 9

| Product |  | Comparative Sample 3 | Sample 11 |
|---|---|---|---|
| Freshwater | ppb | 309 | 309 |
| DUOVIS ® | ppb | 1.2 | 1.2 |
| FLOTROL ® | ppb | 3 | 3 |
| EMI-1994 | ppb | 1.0 | 1 |
| EMI-1993 | ppb | — | 4 |
| triethanolamine | ppb | 4 | — |
| KOH | ppb | 2 drops | 2 drops |
| Barite | ppb | 65.2 | 65.2 |

The fluids were heat aged for 16 hours at 150° F., the rheological properties of the heat-aged fluids were measured using a Fann 35 Viscometer, available from Fann Instrument Company. Electrical conductivity was also measured. The results are shown in Table 2.

TABLE 10

| Rheology |  | Comparative Sample 3 | Sample 11 |
|---|---|---|---|
| Temperature | ° C. | 25 | 25 |
| 600 | rpm | 51 | 44 |
| 300 | rpm | 39 | 30 |
| 200 | rpm | 33 | 20 |
| 100 | rpm | 26 | 15 |
| 6 | rpm | 12 | 3 |
| 3 | rpm | 10 | 2 |
| GELS 10" | lbs/100 ft$^2$ | 13 | 3 |
| GELS 10' | lbs/100 ft$^2$ | 15 | 4 |
| Plastic Viscosity | cP | 12 | 14 |
| Yield Point | lbs/100 ft$^2$ | 27 | 16 |
| pH |  | 8.6 | 8.3 |
| Conductivity | uS/cm | 905 | 1053 |

Results of the dispersion and bulk hardness tests are shown in Table 11.

TABLE 11

|  |  | Comparative Sample 3 | Sample 11 |
|---|---|---|---|
| Dispersion Test |  |  |  |
| Weight of Cuttings Recovered | g | 15.06 | 18.0 |
| Percent Recovery | % | 54.0 | 64.5 |
| Bulk Hardness Test |  |  |  |
| Turns/Torque | 11 |  |  |
|  | 12 |  | 5 |
|  | 13 | 5 | 20 |
|  | 14 | 5 | 30 |
|  | 15 | 5 | 40 |
|  | 16 | 5 | 50 |
|  | 17 | 5 | 65 |
|  | 18 | 5 | 80 |
|  | 19 | 5 | 150 |
|  | 20 | 225 | 225 |

Advantageously, embodiments of the present disclosure may provide for at least one of the following. The non-ionic amines of the present disclosure may perform as a shale inhibitor and/or encapsulator to reduce the swelling or hydration of shales during drilling. Moreover, such additives do not significantly contribute to an increase in the electrical conductivity of the fluid, allowing for broader applicability for land disposal due to environmental concerns for disposal of high conductivity fluids/cuttings.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed:

1. A low electrical conductivity water-based wellbore fluid for use in drilling wells through a formation containing a clay which swells in the presence of water, said wellbore fluid comprising:
   an aqueous base fluid;
   a weight material;
   a viscosifying agent; and
   a polymeric non-ionic tertiary amine.

2. The wellbore fluid of claim 1, wherein the polymeric non-ionic tertiary amine comprises a condensation reaction product of a tri-hydroxyalkyl amine.

3. The wellbore fluid of claim 2, wherein the condensation reaction product has the general formula:

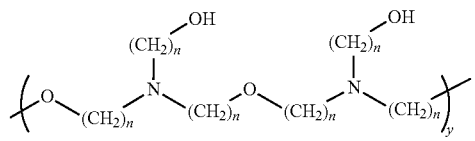

wherein each n is individually selected from the range from 1 to 3, and y ranges from 2 to 2000.

4. The wellbore fluid of claim 2 wherein the tri-hydroxyalkyl amine is selected from the group consisting of trimethanolamine, triethanolamine and tripropanolamine.

5. The wellbore fluid of claim 1, wherein the weight material is selected from the group consisting of: barite, iron oxide, and calcite.

6. The wellbore fluid of claim 1, wherein the wellbore fluid has an electrical conductivity of less than about 10,000 µS/cm.

7. The wellbore fluid of claim 1, wherein the wellbore fluid has an electrical conductivity of less than about 2000 µS/cm.

8. A method of reducing the swelling of clay in a well comprising:
   circulating in the well a water based wellbore fluid comprising:
      an aqueous base fluid;
      a weight material;
      a viscosifying agent; and
      a polymeric non-ionic tertiary amine.

9. The method of claim 8, wherein the polymeric non-ionic tertiary amine comprises a condensation reaction product of a tri-hydroxyalkyl amine.

10. The method of claim 9, wherein the condensation reaction product has the general formula:

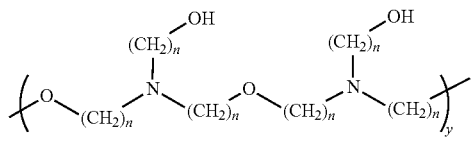

wherein each n is individually selected from the range from 1 to 3, and y ranges from 2 to 2000.

11. The method of claim 9, wherein the tri-hydroxyalkyl amine is selected from the group consisting of trimethanolamine, triethanolamine or tripropanolamine.

12. The method of claim 8, wherein the wellbore fluid has an electrical conductivity of less than about 10,000 µS/cm.

13. The method of claim 12, wherein the wellbore fluid has an electrical conductivity of less than about 2000 µS/cm.

14. The method of claim 8, further comprising:
   disposing of at least a portion of the wellbore fluid or cuttings on land.

15. A method for controlling shale hydration in the drilling of subterranean wells comprising:
   adding to said well a water-based wellbore fluid comprising:
      an aqueous base fluid;
      a weight material;
      a viscosifying agent; and
      a polymeric non-ionic tertiary amine.

16. The method of claim 15, wherein the polymeric non-ionic tertiary amine comprises a condensation reaction product of a tri-hydroxyalkyl amine.

17. The method of claim 16, wherein the condensation reaction product has the general formula:

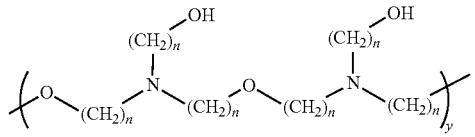

wherein each n is individually selected from the range from 1 to 3, and y ranges from 2 to 2000.

18. The method of claim 16, wherein the tri-hydroxyalkyl amine is selected from the group consisting of trimethanolamine, triethanolamine or tripropanolamine.

19. The method of claim 15, wherein the wellbore fluid has an electrical conductivity of less than about 10,000 µS/cm.

20. The method of claim 19, wherein the wellbore fluid has an electrical conductivity of less than about 2000 µS/cm.

* * * * *